United States Patent
Morotomi et al.

(10) Patent No.: US 10,247,083 B2
(45) Date of Patent: Apr. 2, 2019

(54) STRADDLE VEHICLE AND RADIATOR AIR-GUIDE DEVICE

(71) Applicant: KAWASAKI JUKOGYO KABUSHIKI KAISHA, Kobe-shi (JP)

(72) Inventors: Satoshi Morotomi, Kakogawa (JP); Hideaki Kawai, Akashi (JP); Tetsuji Yamamoto, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 15/993,337

(22) Filed: May 30, 2018

(65) Prior Publication Data
US 2019/0063301 A1 Feb. 28, 2019

(30) Foreign Application Priority Data
Aug. 22, 2017 (JP) ................. 2017-159337

(51) Int. Cl.
B60K 11/04 (2006.01)
F01P 5/06 (2006.01)
B60K 13/04 (2006.01)
B62J 17/00 (2006.01)
B62K 11/00 (2006.01)

(52) U.S. Cl.
CPC ............ F01P 5/06 (2013.01); B60K 11/04 (2013.01); B60K 13/04 (2013.01); *B62J 17/00* (2013.01); *B62K 11/00* (2013.01)

(58) Field of Classification Search
CPC ......... B60K 11/02; B60K 11/04; B60K 11/06; B60K 11/08

USPC ................................. 180/68.4, 68.6
See application file for complete search history.

(56) References Cited

U.S. PATENT DOCUMENTS

| 4,604,974 A * | 8/1986 | Watanabe ................ F01P 11/10 123/41.01 |
| 5,131,352 A * | 7/1992 | Hoshino ................... F01P 5/06 123/41.49 |
| 5,219,016 A * | 6/1993 | Bolton ................. B60H 1/3227 165/140 |
| 5,267,624 A * | 12/1993 | Christensen ........... B60K 11/04 165/98 |

(Continued)

FOREIGN PATENT DOCUMENTS

JP 2013-136273 7/2013

*Primary Examiner* — Jeffrey J Restifo
(74) *Attorney, Agent, or Firm* — Fay Kaplun & Marcin, LLP

(57) ABSTRACT

A straddle vehicle is capable of discharging high-temperature outdoor air having passed through a radiator with high efficiency. A motorcycle 1 includes a radiator, a fan, and a fan shroud. The radiator lowers the temperature of a coolant by heat exchange between outdoor air and the coolant. The fan suctions outdoor air, to make the outdoor air hit the radiator arranged upstream in an outdoor air flow direction. The fan shroud covers at least part of the fan, and discharges high-temperature outdoor air, which is outdoor air suctioned by the fan and having passed through the radiator, to outside. The fan shroud has a discharge opening and an air guide. The discharge opening allows the high-temperature outdoor air to be discharged outside. The air guide guides the high-temperature outdoor air such that it is discharged through the discharge opening in a direction including a laterally outward component.

10 Claims, 8 Drawing Sheets

(56) References Cited

U.S. PATENT DOCUMENTS

| | | | | |
|---|---|---|---|---|
| 5,476,138 A * | 12/1995 | Iwasaki | B60H 1/00321 | 165/41 |
| 5,626,202 A * | 5/1997 | Barnes | B60K 11/04 | 165/121 |
| 5,724,925 A * | 3/1998 | Ito | B60K 11/02 | 123/41.49 |
| 5,771,961 A * | 6/1998 | Alizadeh | B60K 11/04 | 165/121 |
| 5,839,397 A * | 11/1998 | Funabashi | B60K 11/04 | 123/41.01 |
| 6,209,627 B1 * | 4/2001 | Hasumi | F01P 5/06 | 123/41.49 |
| 6,216,778 B1 * | 4/2001 | Corwin | F01P 5/02 | 123/196 AB |
| 6,302,066 B1 * | 10/2001 | Steinmann | B60K 11/02 | 123/41.49 |
| 6,363,892 B1 * | 4/2002 | Zobel | F04D 29/582 | 123/41.12 |
| 6,401,801 B1 * | 6/2002 | Dicke | B60K 11/04 | 123/41.33 |
| 6,435,264 B1 * | 8/2002 | Konno | B60K 11/04 | 123/41.49 |
| 6,684,937 B2 * | 2/2004 | Lenz | F28D 1/0435 | 165/149 |
| 6,772,824 B1 * | 8/2004 | Tsuruta | B60K 11/02 | 123/41.49 |
| 6,832,644 B2 * | 12/2004 | Stauder | F01P 7/10 | 123/41.04 |
| 6,988,573 B2 * | 1/2006 | Tsuruta | B60K 11/08 | 123/41.56 |
| 7,370,717 B2 * | 5/2008 | Okuno | F01P 3/18 | 180/219 |
| 7,448,461 B2 * | 11/2008 | Misaki | B62J 17/02 | 180/229 |
| 7,481,287 B2 * | 1/2009 | Madson | F01P 5/06 | 180/68.1 |
| 7,987,938 B2 * | 8/2011 | Morita | B60K 11/04 | 180/229 |
| 7,992,664 B2 * | 8/2011 | Kiener | B60K 11/085 | 180/68.1 |
| 8,013,458 B2 * | 9/2011 | Eisenhour | B60K 11/02 | 290/2 |
| 8,122,990 B2 * | 2/2012 | Suzuki | B60K 11/04 | 180/218 |
| 8,137,061 B2 * | 3/2012 | Ito | B60K 11/04 | 123/41.49 |
| 8,141,670 B2 * | 3/2012 | Hayashi | B60K 11/04 | 180/68.4 |
| 8,221,074 B2 * | 7/2012 | Nelson | F04D 29/646 | 415/213.1 |
| 8,256,551 B2 * | 9/2012 | Entriken | F01P 1/06 | 123/41.49 |
| 8,312,949 B2 * | 11/2012 | Hirukawa | B60K 11/08 | 180/68.1 |
| 8,403,089 B2 * | 3/2013 | Braun | B60K 11/08 | 180/68.1 |
| 8,424,589 B2 * | 4/2013 | McMillan | F01M 5/002 | 123/196 AB |
| 8,573,343 B2 * | 11/2013 | Komatsu | B60K 11/04 | 180/68.1 |
| 8,707,926 B2 * | 4/2014 | Tadokoro | F02F 7/006 | 123/193.5 |
| 8,752,660 B2 * | 6/2014 | Ajisaka | B60K 11/04 | 180/291 |
| 9,180,772 B2 * | 11/2015 | Durello | B60K 11/02 | |
| 9,261,011 B2 * | 2/2016 | Keerl | F01P 3/18 | |
| 9,360,030 B2 * | 6/2016 | Bui | F16B 5/0012 | |
| 9,440,504 B2 * | 9/2016 | Bagnariol | B60G 7/006 | |
| 9,487,076 B2 * | 11/2016 | Matsuo | B60K 11/04 | |
| 9,505,300 B2 * | 11/2016 | Grasso | B60K 11/04 | |
| 9,676,271 B1 * | 6/2017 | Barzen | B60K 11/08 | |
| 9,694,668 B1 * | 7/2017 | Yun | B60K 11/04 | |
| 9,731,591 B2 * | 8/2017 | Kuhn | B60K 11/04 | |
| 9,829,010 B2 * | 11/2017 | Yoshida | F04D 29/164 | |
| 10,012,130 B2 * | 7/2018 | Hoshi | B60K 11/04 | |
| 2013/0168039 A1 | 7/2013 | Arai et al. | | |

* cited by examiner

STRADDLE VEHICLE AND RADIATOR AIR-GUIDE DEVICE

BACKGROUND OF THE INVENTION

1. Field of the Invention

The present invention generally relates to a straddle vehicle including a radiator and a fan shroud.

2. Description of the Related Art

Japanese Patent Application Laid-Open No. 2013-136273 discloses a straddle vehicle including a radiator, an electric fan, and a fan shroud.

The radiator releases heat from a coolant by heat exchange between the coolant and ram air. The electric fan suctions outdoor air, thereby suctioning out high-temperature outdoor air (hot air) having passed through the radiator. The fan shroud, which covers the electric fan, has an opening provided in a lower portion of the fan shroud. This configuration allows the high-temperature outdoor air suctioned out by the electric fan to flow downward through the opening of the fan shroud.

SUMMARY OF THE INVENTION

The present invention relates to a straddle vehicle capable of discharging high-temperature outdoor air having passed through a radiator with higher efficiency.

According to an exemplary embodiment of the present invention, a straddle vehicle is configured as follows. The straddle vehicle includes a radiator, a fan, and a fan shroud. The radiator lowers the temperature of a coolant by heat exchange between outdoor air and the coolant. The fan suctions outdoor air, to make the outdoor air hit the radiator arranged upstream in an outdoor air flow direction. The fan shroud covers at least part of the fan, and discharges high-temperature outdoor air, which is outdoor air suctioned by the fan and having passed through the radiator, to outside. The fan shroud has a discharge opening and an air guide. The discharge opening allows the high-temperature outdoor air to be discharged outside. The air guide guides the high-temperature outdoor air such that the high-temperature outdoor air is discharged through the discharge opening in a direction including a laterally outward component.

According to another exemplary embodiment of the present invention provides a radiator air-guide device configured as follows. The radiator air-guide device introduces outdoor air to a radiator provided in a straddle vehicle and discharges the outdoor air. The radiator air-guide device includes a fan and a fan shroud. The fan suctions outdoor air, to make the outdoor air hit the radiator arranged upstream in an outdoor air flow direction. The fan shroud covers at least part of the fan, and discharges high-temperature outdoor air, which is outdoor air suctioned by the fan and having passed through the radiator, to outside. The fan shroud has a discharge opening and an air guide. The discharge opening allows the high-temperature outdoor air to be discharged outside. The air guide guides the high-temperature outdoor air such that the high-temperature outdoor air is discharged through the discharge opening in a direction including a component that is directed laterally outward of the straddle vehicle.

Since the high-temperature outdoor air can be discharged laterally outward, the high-temperature outdoor air is less likely to hit members included in the straddle vehicle, and therefore heat release performance can be improved. Accordingly, in a case where the amount of heat-resistant protection members used can be reduced, costs for the straddle vehicle can be lowered.

An embodiment of the present invention can provide a straddle vehicle capable of discharging high-temperature outdoor air having passed through a radiator with high efficiency.

DETAILED DESCRIPTION OF THE PREFERRED EMBODIMENTS

Hereinafter, an embodiment of the present invention will be described with reference to the drawings. In descriptions below, front, rear, left, and right directions are defined relative to a direction in which a motorcycle 1 travels forward being set as the front, and in other words, the left-right direction (lateral direction) are defined based on the view from a rider riding on the motorcycle 1. Upper and lower sides are defined relative to the vertical direction. Terms describing positional relationships, sizes, shapes, and the like should be interpreted as encompassing not only a state where the meaning of the term is completely established but also a state where the meaning of the term is substantially established. A description "A is attached (mounted, installed, etc.) to B" should be interpreted as showing not only a configuration in which A is directly attached (mounted, installed, etc.) to B but also a configuration in which A is attached (mounted, installed, etc.) to B with interposition of another attachment member or the like.

Figure 1:
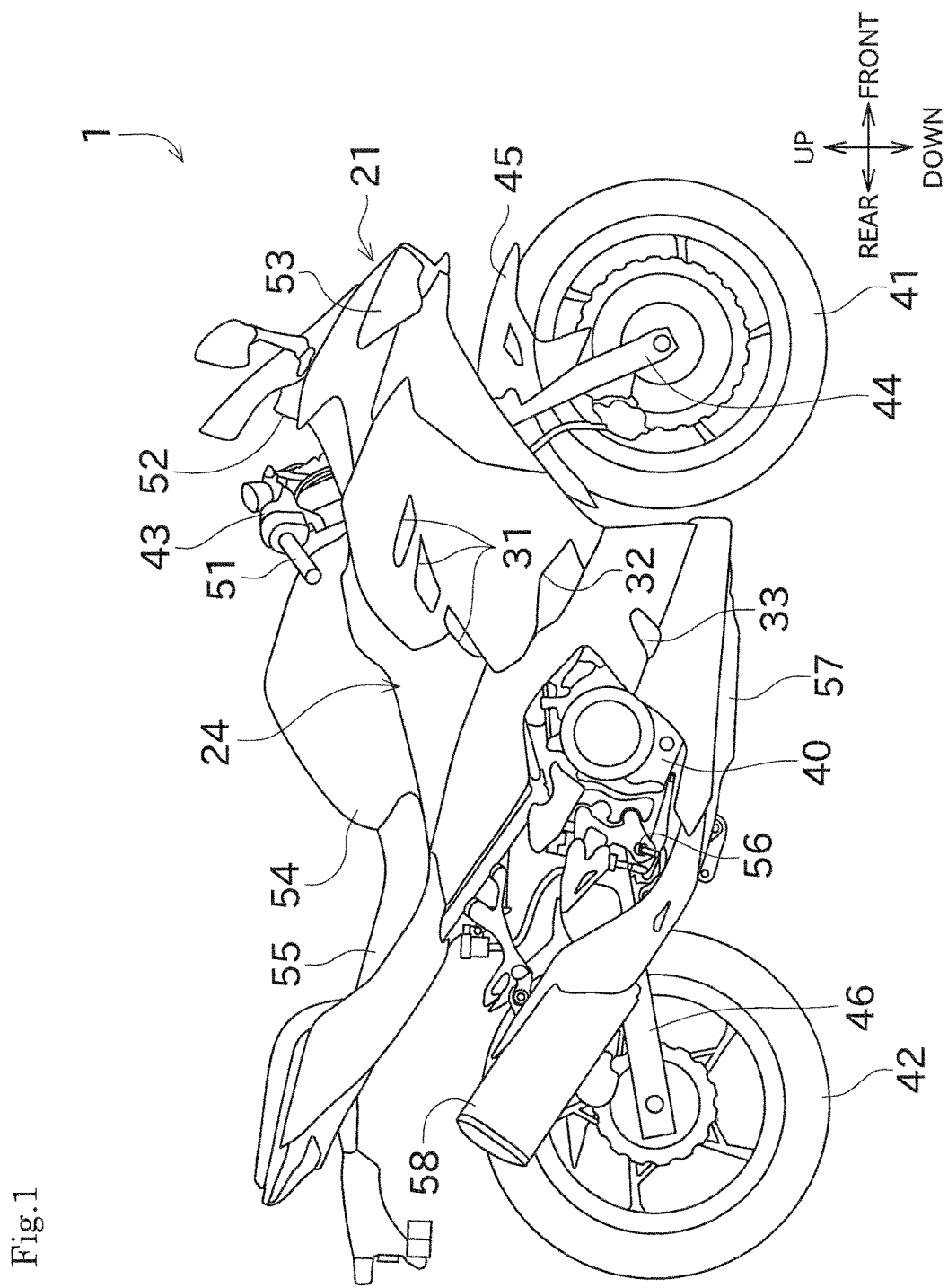
FIG. 1 is a side view of a motorcycle according to an embodiment of the present invention.
Figure 2:
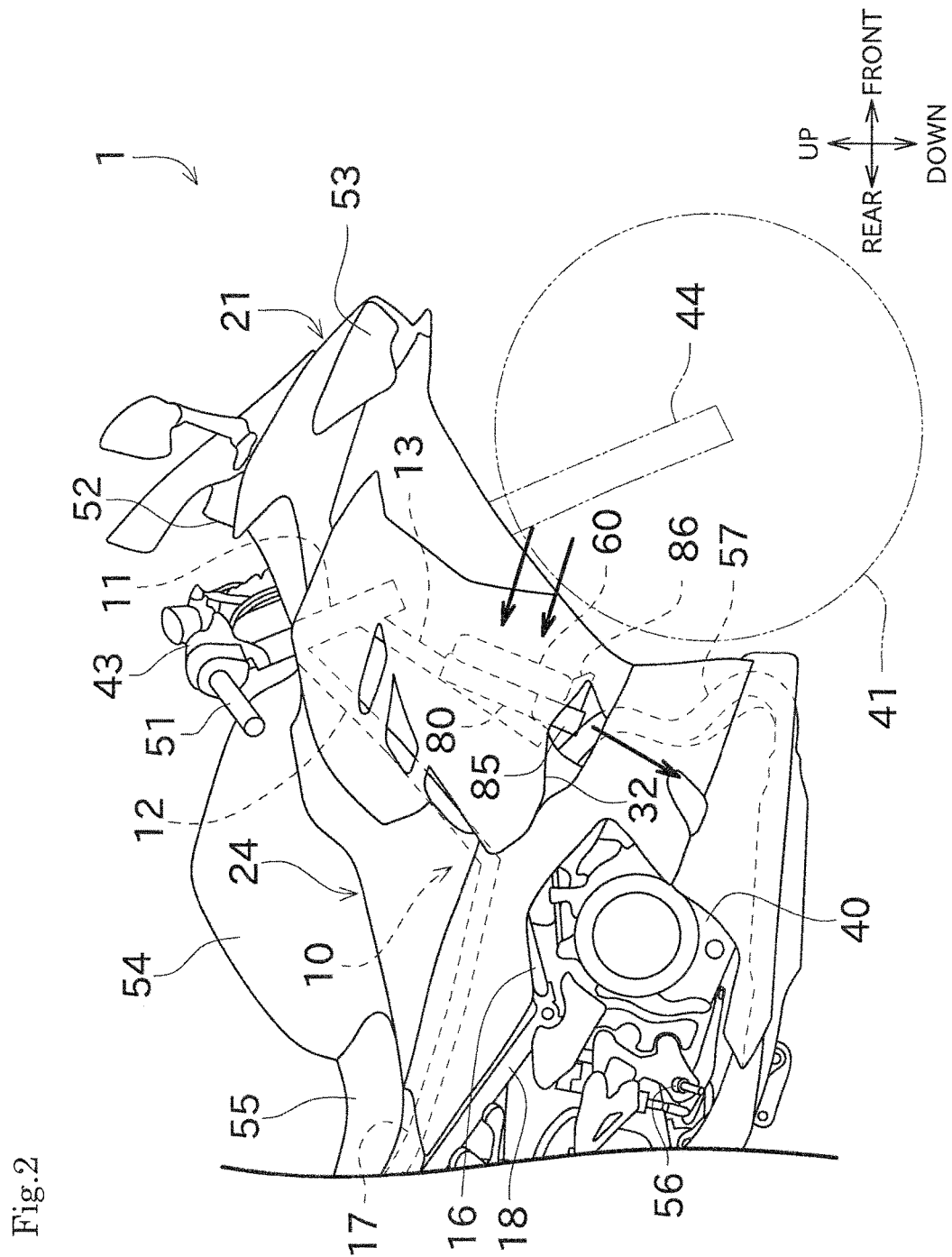
FIG. 2 is an enlarged side view showing a frame configuration of the motorcycle and a position where a radiator is attached.
Figure 3:
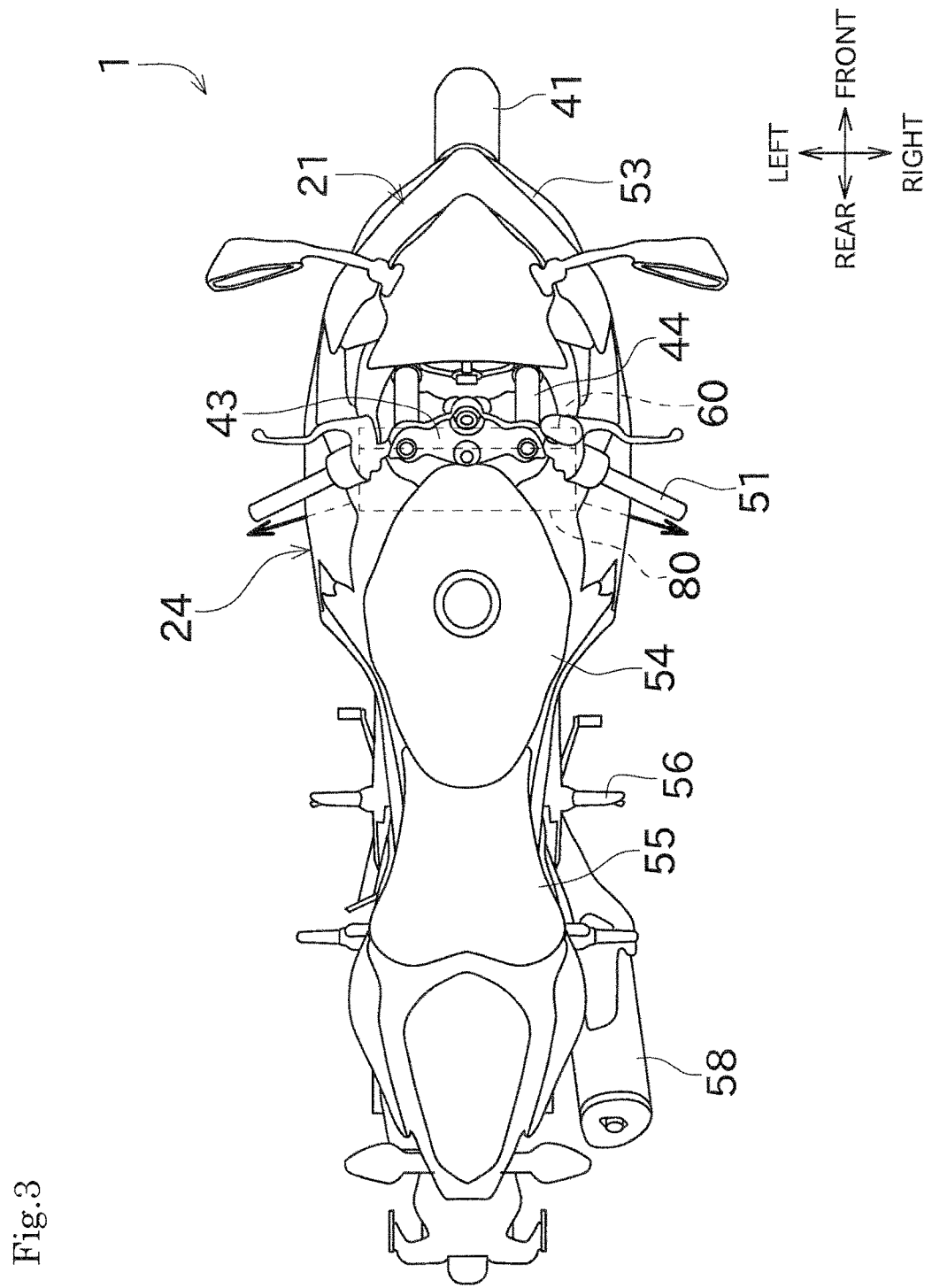
FIG. 3 is a top plan view of the motorcycle.
Figure 4:
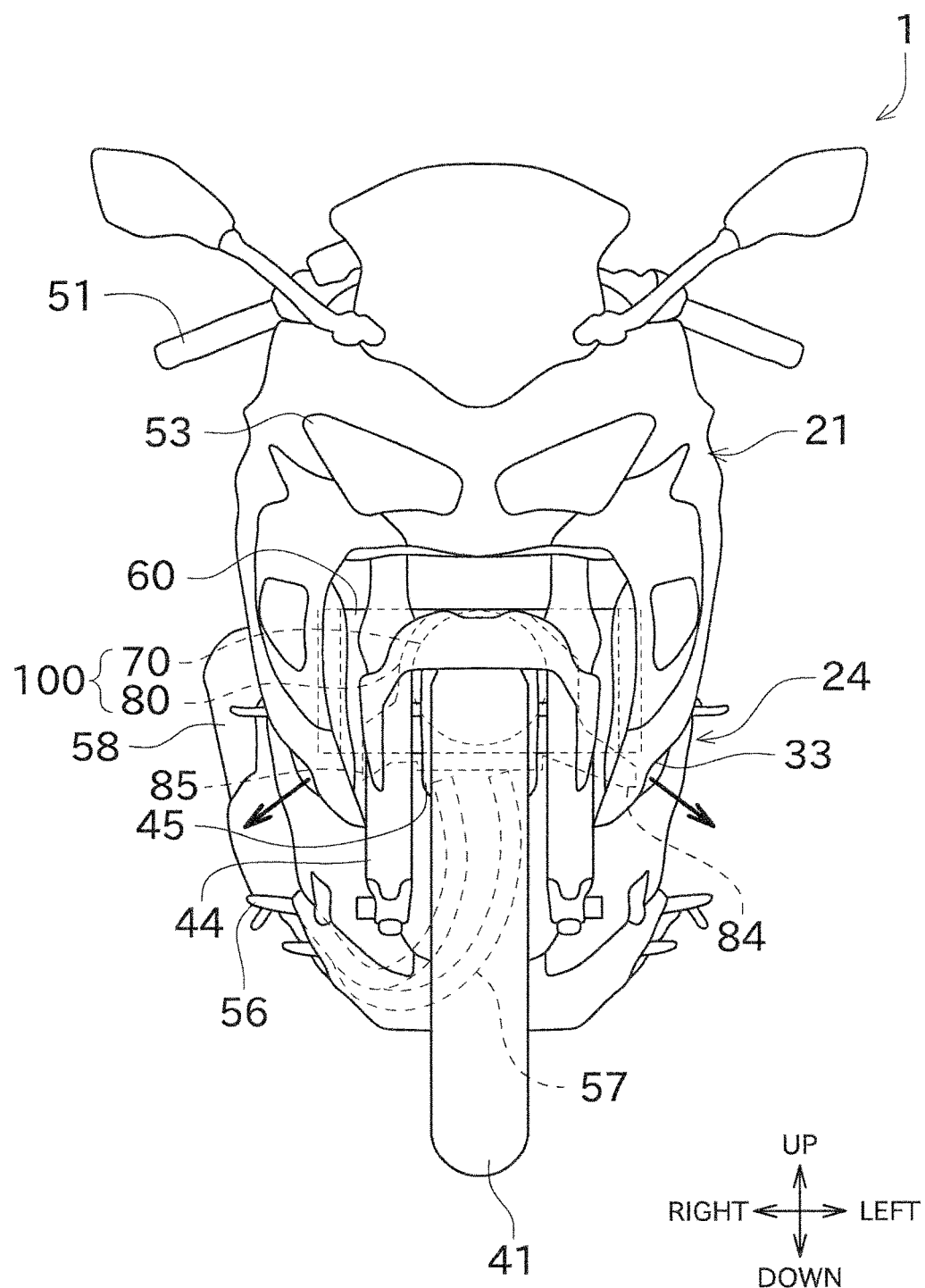
FIG. 4 is a front view of the motorcycle.

First, outline of the motorcycle (straddle vehicle) 1 will be described with reference to FIG. 1 to FIG. 4. FIG. 1 is a side view of the motorcycle 1. FIG. 2 is an enlarged side view showing a frame configuration of the motorcycle 1 and a position where a radiator is attached. FIG. 3 is a top plan view of the motorcycle 1. FIG. 4 is a front view of the motorcycle 1.

As shown in FIG. 1, the motorcycle 1 includes an engine 40, a front tire 41, and a rear tire 42. These members are supported on a vehicle body frame 10 shown in FIG. 2. The vehicle body frame 10 includes a head pipe frame 11, main frames 12, lower frames 13, rear frames 17, and rear stays 18.

The head pipe frame 11 has a shaft insertion hole for insertion of a steering shaft (not shown). An upper bracket 43 shown in FIG. 1 to FIG. 3 is attached to an upper portion of the head pipe frame 11. The upper bracket 43 and a lower bracket (not shown) have fork insertion holes for insertion of a pair of left and right front forks 44, respectively. In this configuration, the upper bracket 43 and the lower bracket support the front forks 44. The front tire 41 is rotatably attached to lower potions of the front forks 44. A front fender 45 is arranged above the front tire 41.

The main frames 12 and the lower frames 13 are connected to the head pipe frame 11. The main frames 12 comprise a pair of left and right main frames 12, each of which is arranged so as to extend from an upper portion of the head pipe frame 11 toward the rear (obliquely downward toward the rear). The lower frames 13 comprise a pair of left and right lower frames 13, each of which is arranged so as to extend from a lower portion of the head pipe frame 11 toward the rear (obliquely downward toward the rear). The engine 40 is attached to the rear ends of the lower frames 13.

The pair of left and right rear frames 17 are attached to the rear ends of the main frames 12, respectively. The rear frames 17 are arranged so as to extend from the rear ends of the main frames 12 toward the rear (obliquely upward toward the rear). Below the rear frames 17, the pair of left and right rear stays 18 are arranged. The rear stays 18 are arranged so as to extend toward the rear (obliquely upward toward the rear). Each of the rear stays 18 has its front end attached to a front end of each of the rear frames 17 via a frame coupling member 16.

To the front end of each rear stay 18, a swing arm 46 is attached via a swing arm bracket (not shown). The swing arm 46 is arranged so as to extend toward the rear, and the rear tire 42 is rotatably attached to a rear portion of the swing arm 46. Power generated by the engine 40 is transmitted to the rear tire 42 via a drive chain (not shown).

A steering handle 51 is attached to the upper bracket 43. Since the front forks 44 are attached to the upper bracket 43 as mentioned above, a rider is able to steer the motorcycle 1 by turning the steering handle 51. Arranged in front of the steering handle 51 is an indicator device 52 capable of displaying the vehicle speed, the engine rotation speed, warning information, and the like. Arranged in front of the indicator device 52 is a head lamp 53 for illuminating the front side.

A fuel tank 54 for storing a fuel to be supplied to the engine 40 is arranged at the rear of the upper bracket 43. The engine 40 is arranged below the fuel tank 54. A seat 55 for a rider to be seated thereon is arranged at the rear of the fuel tank 54. Steps 56 on which the rider seated on the seat 55 places his/her feet are arranged below the seat 55. The rider seated on the seat 55 places his/her feet on the steps 56 with the fuel tank 54 and a region below the fuel tank 54 sandwiched between his/her legs, which allows the rider to stabilize his/her body and to shift his/her weight to left or right when performing part of steering operations.

A radiator 60 and a fan shroud 80 are arranged at the rear of the front tire 41. Cooling water (coolant) for cooling the engine 40 flows inside the radiator 60. The radiator 60 releases heat from the cooling water by heat exchange between the cooling water and outdoor air. To be specific, while the motorcycle 1 is traveling at a high speed, ram air hits the radiator 60, so that heat is exchanged between outdoor air and the cooling water. While the motorcycle 1 is stopped or traveling at a low speed, a fan 70 provided inside the fan shroud 80 which is arranged at the rear (downstream in an outdoor air flow direction) of the radiator 60 suctions outdoor air, so that the outdoor air hits the radiator 60 to lower the temperature of the cooling water. Detailed configurations and arrangements of the radiator 60 and the fan shroud 80 will be given later. The fan 70 and the fan shroud 80 will hereinafter be collectively referred to as a radiator air-guide device 100.

Exhaust gas generated in the engine 40 is discharged through an exhaust pipe 57 which is connected to the engine 40. As shown in FIG. 2, the exhaust pipe 57 is arranged so as to extend from the front end and an upper portion of the engine 40 obliquely downward toward the front, and then extend downward. Since the motorcycle 1 of this embodiment has a multi-cylinder (in detail, two-cylinder) engine 40, the number of exhaust pipes 57 connected to the engine 40 is according to the number of cylinders. Such a plurality of exhaust pipes 57 are put together below the motorcycle 1 (below the engine 40), and are arranged so as to extend rearward. A muffler 58 for reducing exhaust noise is connected to the rear end of the exhaust pipe 57. Exhaust gas of the motorcycle 1 is discharged outside through the muffler 58.

As shown in FIG. 1, etc., the motorcycle 1 includes a front cowl 21 and a side cowl 24. The front cowl 21 is arranged mainly in a front portion of a vehicle body, and more specifically is arranged around the head lamp 53 as shown in FIG. 4, etc., below the indicator device 52 and above the front tire 41 as shown in FIG. 1, etc., for example.

The side cowl 24 is arranged mainly on side surfaces of the vehicle body, and more specifically is arranged below the fuel tank 54, on the front side of the seat 55, on the rear side of the front tire 41, on the front side of the swing arm 46, as shown in FIG. 1, etc., for example. The side cowl 24 includes a plurality of cowl members. The side cowl 24 includes a plurality of first cowl openings 31, second cowl openings 32, and third cowl openings 33. The first cowl openings 31, second cowl openings 32, and third cowl openings 33 are formed in left and right side surfaces of the side cowl 24, respectively.

The side cowl 24 is arranged in a portion at the rear of the front cowl 21, the portion including a region below the steering handle 51 and a region below the fuel tank 54 in a side view. The first cowl openings 31 are formed at positions below the steering handle 51 or below the fuel tank 54, the positions being coincident with or lower than the position of the head lamp 53 with respect to the up-down direction (vertical direction), in a side view.

Each second cowl opening 32 is formed in a portion constituting a vertically middle portion of the side cowl 24, and at such a position that the second cowl opening 32 overlaps mainly a front portion of the fuel tank 54 with respect to the front-rear direction (longitudinal direction). The second cowl opening 32 is formed in a boundary portion between two cowl members. The second cowl opening 32 is formed below the first cowl openings 31.

Each third cowl opening 33 is formed in a portion constituting a vertically lower portion of the side cowl 24, and at such a position that the third cowl opening 33 overlaps mainly a middle portion of the fuel tank 54 with respect to the front-rear direction. The third cowl opening 33 is formed in a boundary portion between two cowl members.

Figure 5:
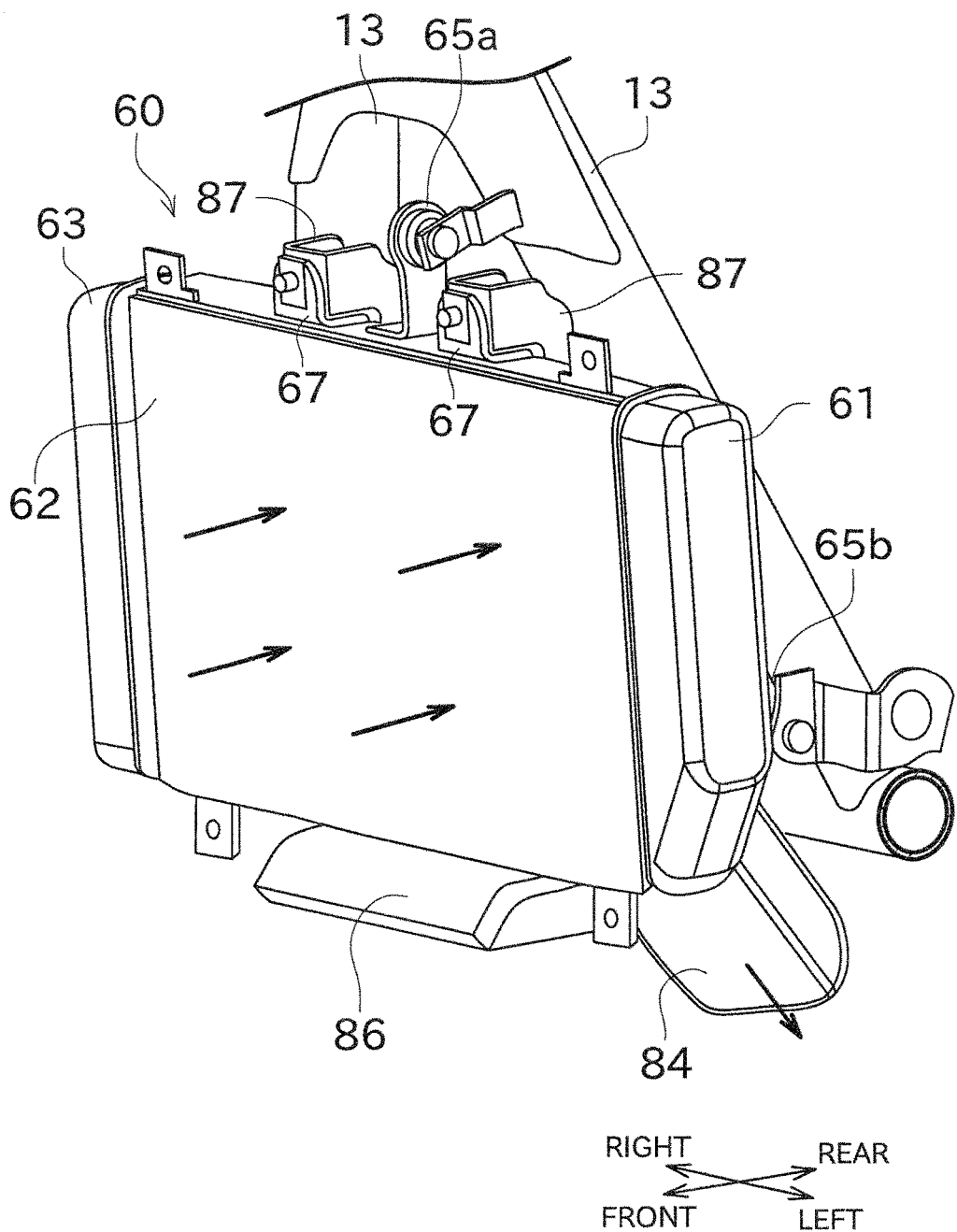
FIG. 5 is a perspective view showing the radiator and a radiator air-guide device as viewed from the front.
Figure 6:
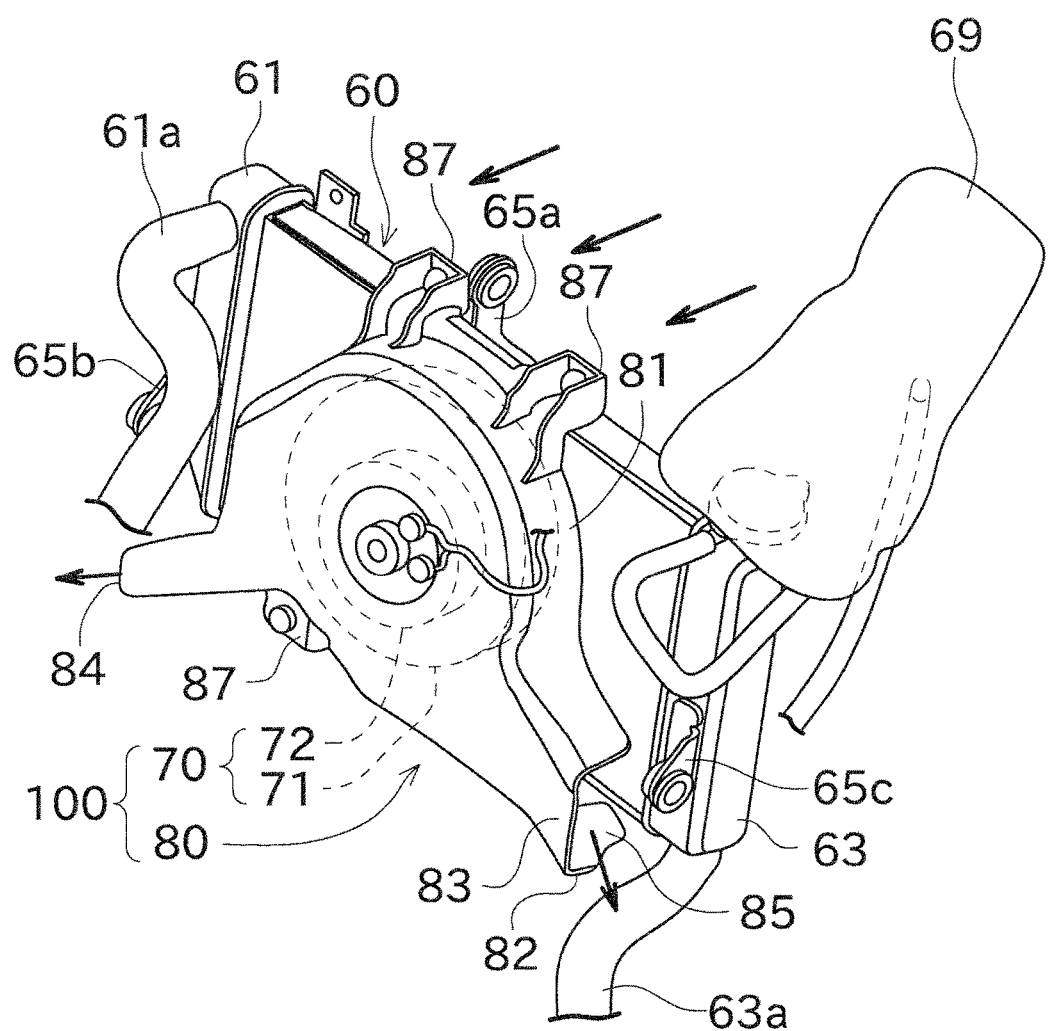
FIG. 6 is perspective view showing the radiator and the radiator air-guide device as viewed from the rear.
Figure 6:
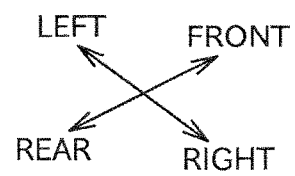
Figure 7:
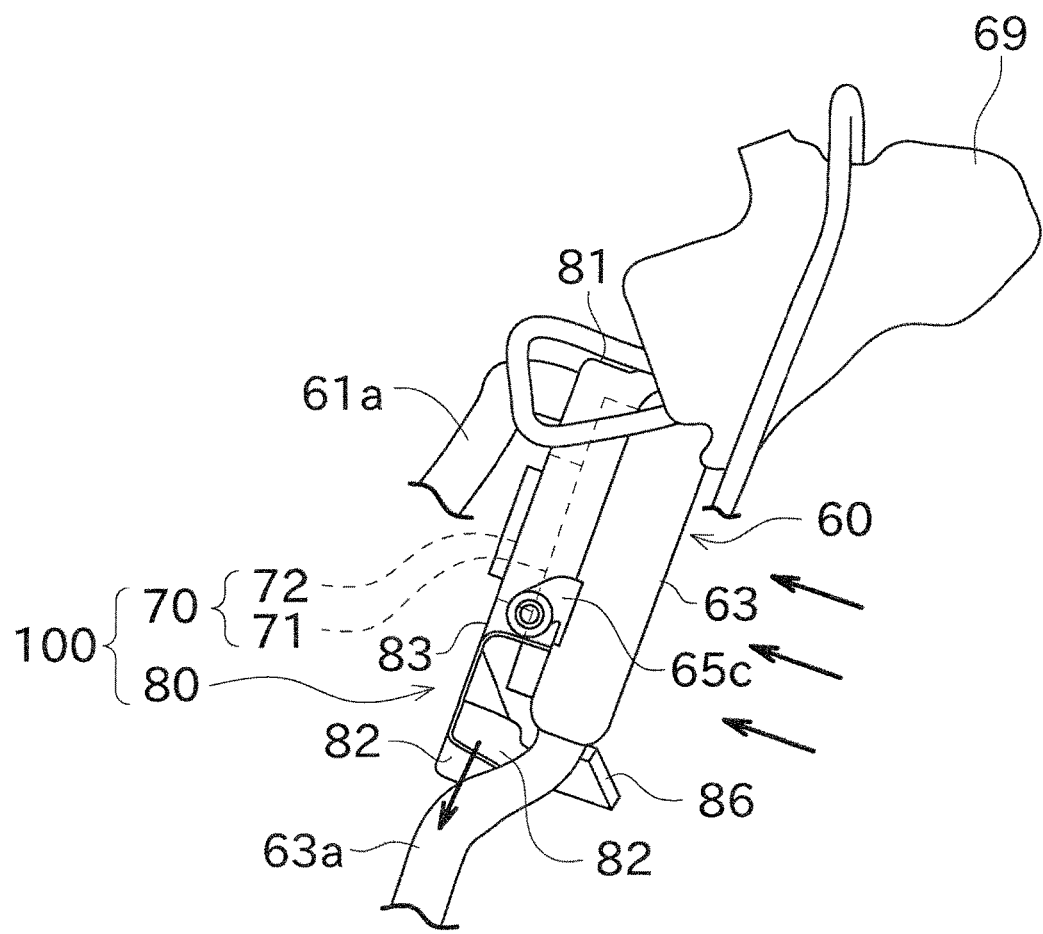
FIG. 7 is a side view of the radiator and the radiator air-guide device.
Figure 8:
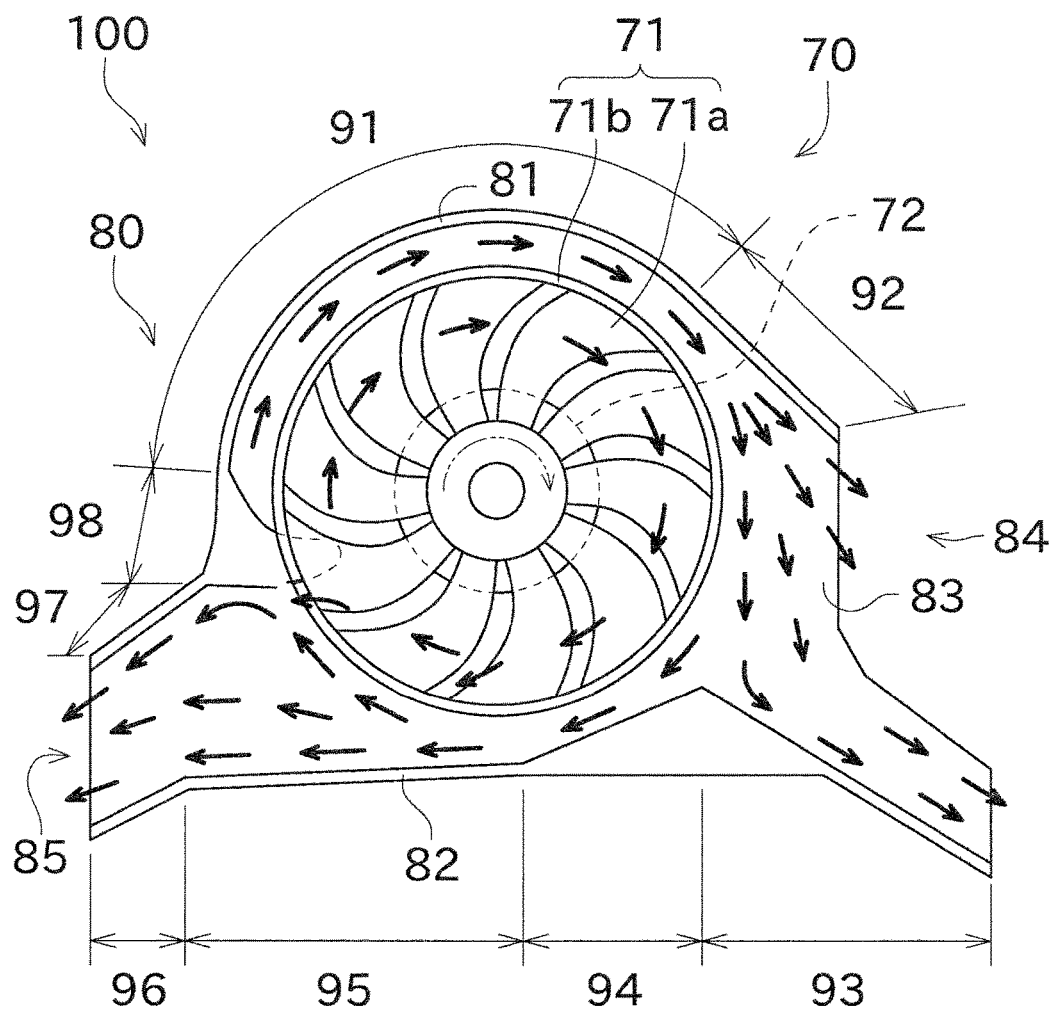
FIG. 8 is a front view schematically showing an air guide structure of a fan shroud.

Details of the radiator 60 and the radiator air-guide device 100 will now be described additionally with reference to FIG. 5 to FIG. 8. FIG. 5 is a perspective view of the radiator 60 and the radiator air-guide device 100 as viewed from the front. FIG. 6 is a perspective view of the radiator 60 and the radiator air-guide device 100 as viewed from the rear. FIG. 7 is a side view of the radiator 60 and the radiator air-guide device 100. In FIG. 2 to FIG. 8, the thick line arrows indicate flows of outdoor air (ambient-temperature outdoor air) introduced to the radiator 60 and flows of outdoor air (high-temperature outdoor air) having a raised temperature after passing through the radiator 60. FIG. 8 is a front view schematically showing an air guide structure of the fan shroud 80.

As shown in FIG. 5 and FIG. 6, the radiator 60 includes an introduction tank 61, a core 62, and an outlet tank 63. The introduction tank 61 and the outlet tank 63 are arranged on one side and the other side of the core 62 with respect to the lateral direction. In this embodiment, the introduction tank 61 having a substantially rectangular parallelepiped shape is arranged on the left side of the core 62 having a substantially rectangular parallelepiped shape, and the outlet tank 63 having a substantially rectangular parallelepiped shape is arranged on the right side of the core 62. In this embodiment, the lateral direction of the motorcycle 1 and the lengthwise direction of the core 62 are the same direction. The radiator 60 is arranged tilted with its upper portion being more frontward.

As shown in FIG. 6, an upper hose 61*a* is connected to an upper portion of a rear surface of the introduction tank 61. The upper hose 61*a* is connected to the engine 40. Cooling water having a raised temperature after passing through the engine 40 is introduced to the introduction tank 61 through the upper hose 61*a*. The core 62 is supplied with the high-temperature cooling water from the introduction tank 61. The core 62, which is provided with fins (not shown) and the like, exchanges heat between the high-temperature cooling water and outdoor air, to thereby lower the temperature of the cooling water. The cooling water whose temperature has been lowered is supplied from the core 62 to the outlet tank 63. A lower hose 63*a* is connected to a lower portion of a rear surface of the outlet tank 63. The lower hose 63*a* is connected to the engine 40. The cooling water having a lowered temperature after passing through the core 62 is supplied to the engine 40 again. As shown in FIG. 6 and FIG. 7, a reservoir tank 69 is arranged above the outlet tank 63.

The radiator 60 is attached to the lower frames 13 described above. More specifically, as shown in FIG. 6 and FIG. 7, a first frame attachment portion 65*a* is provided on the upper side of the core 62, a second frame attachment portion 65*b* is provided on the rear surface side of the introduction tank 61, and a third frame attachment portion 65*c* is provided on the rear surface side of the outlet tank 63. As shown in FIG. 5, the pair of lower frames 13 are arranged on the left and right sides, respectively, in such a manner that the distance between the left and right lower frames 13 increases downward. The first frame attachment portion 65*a* is located below and near where the pair of left and right lower frames 13 join together. The first frame attachment portion 65*a* is attached to one (in this embodiment, left one) of the lower frames 13. The second frame attachment portion 65*b* is attached to the left lower frame 13. The third frame attachment portion 65*c* is attached to the right lower frame 13.

The radiator 60 has, in its upper and lower portions, shroud attachment portions 67 for attaching the radiator 60 to the fan shroud 80.

The radiator air-guide device 100, which is attached to a rear portion of the radiator 60, is configured to suction outdoor air to thereby allow the outdoor air to hit the core 62 of the radiator 60. The radiator air-guide device 100 includes the fan 70 and the fan shroud 80.

The fan 70 is arranged inside the fan shroud 80, and is configured to produce a suction flow for suctioning outdoor air. The fan 70, which is an axial-flow fan as shown in FIG. 8, includes a plurality of blades 71*a*, a ring portion 71*b* provided radially outward of the blades 71*a*, and an electric motor 72 for producing power to rotate the blades 71*a*. The blades 71*a* and the ring portion 71*b* will be collectively referred to as a rotary part 71. The rotation direction of the rotary part 71 is clockwise in a front view, as indicated by the two-dot chain line arrow in FIG. 8. The blades 71*a* are rotated clockwise in a front view, thereby producing a gas flow directed from front to rear. The motor 72 is attached to the fan shroud 80 (specifically, to a rear wall portion 83). A harness for supplying electric power source to the motor 72 extends from the rear of the fan shroud 80.

The fan shroud 80 covers the fan 70, and thus allows outdoor air suctioned by the fan 70 to appropriately hit the core 62 of the radiator 60, and also allows high-temperature outdoor air having a raised temperature after passing through the core 62 to be discharged outside. The fan shroud 80 includes a substantially circular portion corresponding to the shape of the fan 70 being expanded radially outward, and portions extending outward to left and right for discharging high-temperature outdoor air. Unlike the core 62, the fan 70 is not rectangular. The core 62, therefore, has a first region where the fan shroud 80 is provided on the rear surface and a second region where the fan shroud 80 is not provided on the rear surface. The first region is mainly used while the motorcycle 1 is stopped or traveling at a low speed. The second region is mainly used while the motorcycle 1 is traveling at a high speed.

As shown in FIG. 5 to FIG. 7, the fan shroud 80 has an upper wall portion 81, a lower wall portion 82, a rear wall portion 83, a left discharge opening 84, a right discharge opening 85, a front protruding portion 86, and radiator attachment portions 87. The fan shroud 80 is made of a resin, and shaped with a die, for example.

The upper wall portion 81 is a wall portion including a portion that covers at least the upper side of the fan 70. The lower wall portion 82 is a wall portion including a portion that covers at least the lower side of the fan 70. The rear wall portion 83, which connects the upper wall portion 81 to the lower wall portion 82, is a wall portion including a portion that covers at least the rear side of the fan 70. High-temperature outdoor air having passed through the core 62 is guided by these wall portions, to be discharged through the left discharge opening 84 and the right discharge opening 85 which are provided laterally outward (details will be given later).

The front protruding portion 86 protrudes frontward from a lower portion of the fan shroud 80. The front end of the front protruding portion 86 is positioned more frontward than the radiator 60. The front protruding portion 86 has an inclined surface (guide surface) that extends with its rear portion being more upward (i.e., being closer to the core 62). This configuration allows outdoor air flowing below the radiator 60 to be guided such that the outdoor air passes through the core 62.

The front protruding portion 86 is provided below the core 62, and therefore functions for protecting the core 62 against, for example, a stone bouncing from a road surface. Particularly in this embodiment, the lateral length of the front protruding portion 86 is longer than the lateral length of the front tire 41 (or the front fender 45). In addition, the front protruding portion 86 is arranged so as to overlap a region between the left and right ends of the front tire 41 in a front view. In other words, the left end (right end) of the front protruding portion 86 is positioned leftward (rightward) of the left end (right end) of the front tire 41. Here, the front protruding portion 86 may not need to completely overlap the front tire 41 with respect to the lateral direction. Partial overlap is sufficient to exert the advantage of protection against a stone bouncing from a road surface.

The radiator attachment portions 87 are formed at positions corresponding to the shroud attachment portions 67 of the radiator 60. To be specific, the radiator attachment portions 87 are formed so as to protrude upward from the upper wall portion 81, and are formed so as to protrude downward from the lower wall portion 82. In this embodiment, the radiator 60 and the fan shroud 80 are coupled to each other at two positions on the upper side and two positions on the lower side.

How the high-temperature outdoor air guided by the radiator air-guide device 100 flows will now be described. A gas flow changes depending on various factors, and moreover gas does not entirely flow along the same path. In the following, therefore, a main flow of the high-temperature outdoor air will be described.

Outdoor air suctioned by the fan 70 passes through the core 62, and becomes high-temperature outdoor air which is then introduced to the fan shroud 80. As shown in FIG. 7, the rotary part 71 (blades 71*a*) is arranged with a gap formed between the rotary part 71 (blades 71*a*) and the rear wall portion 83. Thus, the high-temperature outdoor air having passed through the blades 71*a* hits the rear wall portion 83, travels along the rear wall portion 83, and then is guided by at least one of the upper wall portion 81 or the lower wall portion 82, to be discharged.

Any of inner wall portions of the fan shroud 80 functions as an air guide for guiding the high-temperature outdoor air. Referring to FIG. 8, the fan shroud 80 is divided into first to eighth air guides 91 to 98 in the following description. The first air guide 91, the second air guide 92, and the seventh air guide 97 are parts of the upper wall portion 81. The third to sixth air guides 93 to 96 are parts of the lower wall portion 82. The eighth air guide 98 is a portion protruding radially inward from the inner wall portion of the fan shroud 80.

The shape and function of each air guide will be described below. Here, the blades 71*a* are rotated clockwise in a front view, and thus the high-temperature outdoor air suctioned by the rotary part 71 is also likely to flow clockwise (and to spread radially outward) in a front view. Hereinafter, therefore, the terms "upstream" or "downstream" basically mean upstream or downstream with respect to a clockwise flow direction (the rotation direction of the rotary part 71) in a front view, and at the stage of discharge through the openings, mean upstream or downstream with respect to a discharge direction. In the following, for convenience of illustration, the description will be given sequentially from the first air guide 91, but the first air guide 91 is not always the first to guide the high-temperature outdoor air sent by the fan 70. Any of the second to eighth air guides 92 to 98 may sometimes be the first to guide the high-temperature outdoor air.

The first air guide 91 is an arc-shaped portion whose center is the same as the rotation center of the rotary part 71 (blades 71*a*) and whose diameter is larger than that of the rotary part 71. In other words, the first air guide 91 has a portion that is concentric with the rotary part 71. Providing the arc-shaped first air guide 91 which is concentric with the blades 71*a* enables the high-temperature outdoor air to smoothly flow downstream.

The second air guide 92 is a linear guide extending from a predetermined point on a circle centered at the rotation center of the rotary part 71, in a tangential direction and in the rotation direction of the rotary part 71. The second air guide 92 is a tangential air guide. The second air guide 92 is connected to the downstream side of the first air guide 91. Thus, the second air guide 92 may be expressed also as a guide in the shape of a tangent line extending from an arc of the first air guide 91. The second air guide 92 is inclined with its downstream side (laterally outer side) being more downward. This configuration allows part of the high-temperature outdoor air which has been guided along the arc of the first air guide 91 to be smoothly guided downward and laterally outward. An end portion of the second air guide 92 on the downstream side is not connected to any other air guide, but is provided with the left discharge opening 84. That is, the left discharge opening 84 is formed in an end portion located laterally outward. Thus, the high-temperature outdoor air linearly guided by the second air guide 92 is discharged outside.

Although the first air guide 91 can smoothly guide the high-temperature outdoor air, most of the high-temperature outdoor air is directed to various directions at the stage where it is guided by the first air guide 91. If the first air guide 91 was connected directly to the left discharge opening 84, it would be difficult that the discharge direction of the high-temperature outdoor air be controlled with high accuracy. In this respect, providing the second air guide 92 enables the high-temperature outdoor air to be discharged in a desired direction (details will be given later).

The high-temperature outdoor air having passed through the first air guide 91 and the second air guide 92 is not entirely guided along the second air guide 92, but some of the high-temperature outdoor air flows downward and other some of the high-temperature outdoor air swirls clockwise.

The third air guide 93 is formed at a position including a region below the second air guide 92 and a region laterally outward of the second air guide 92. The left discharge opening 84 is defined by the second air guide 92, the third air guide 93, and the rear wall portion 83 connecting them to each other. The third air guide 93 is a linear guide which is inclined with its downstream side (laterally outer side) being more downward. This configuration allows part of the high-temperature outdoor air having flowed downward from the second air guide 92 to be smoothly guided downward and laterally outward. Particularly in this embodiment, both the third air guide 93 and the second air guide 92 are oriented downward and laterally outward, and therefore it is possible to guide the high-temperature outdoor air in the same direction (desired direction). Since the third air guide 93 is located laterally outward of the second air guide 92, not only part of the high-temperature outdoor air flowing straight downward from the second air guide 92 but also part of the high-temperature outdoor air flowing obliquely downward from the second air guide 92 can be guided by the third air guide 93.

The fourth air guide 94 is connected to the laterally inner side of the third air guide 93. The fourth air guide 94 is a linear guide extending from a predetermined point on a circle centered at the rotation center of the rotary part 71, in a tangential direction and in the rotation direction of the rotary part 71. The fourth air guide 94 is a tangential air guide. The fourth air guide 94 is inclined in the direction opposite to the direction in which the third air guide 93 is inclined. The fourth air guide 94 guides the high-temperature outdoor air toward the side laterally opposite to the third air guide 93.

The fifth air guide 95 is connected to one end side (downstream side) of the fourth air guide 94. Similarly to the fourth air guide 94, the fifth air guide 95 is a tangential air guide. The fifth air guide 95 guides, for example, high-temperature outdoor air having been guided by the fourth air guide 94. The fifth air guide 95 as well as the fourth air guide 94 is inclined with its right side being more downward, but the inclination angle of the fifth air guide 95 is smaller than that of the fourth air guide 94.

The sixth air guide 96 is a linear air guide connected to one end side (downstream side, or laterally outer side) of the fifth air guide 95. The sixth air guide 96 guides, for example, high-temperature outdoor air having been guided by the fifth air guide 95. An end portion of the sixth air guide 96 on the downstream side is not connected to any other air guide, but is provided with the right discharge opening 85. That is, the right discharge opening 85 is formed laterally outward. The high-temperature outdoor air linearly guided by the sixth air guide 96 is discharged outside through the right discharge opening 85. Although the sixth air guide 96 is inclined in the same direction as the direction in which the fifth air guide 95 is inclined, the inclination angle of the sixth air guide 96 is larger than that of the fifth air guide 95. The inclination angle (the acute angle formed between the inclined surface and the vertical direction) of the sixth air guide 96 is equal to that of the third air guide 93. Accordingly, the high-temperature outdoor air can be guided to left and right at the same angle.

The seventh air guide 97 is a linear air guide formed above the sixth air guide 96. The right discharge opening 85 is defined by the sixth air guide 96, the seventh air guide 97, and the rear wall portion 83 connecting them to each other. The inclination angle of the seventh air guide 97 is equal to the inclination angle of the sixth air guide 96. This configuration allows the high-temperature outdoor air to be discharged in a desired direction.

The eighth air guide 98 is an air guide that is connected to the laterally inner side of the seventh air guide 97 and that extends from the seventh air guide 97 further laterally inward. An end portion of the eighth air guide 98 on the laterally inner side overlaps the rotary part 71 when viewed in a rotation axis direction. This configuration allows the high-temperature outdoor air flowing clockwise to be guided in a direction along the seventh air guide 97.

In this manner, the high-temperature outdoor air is smoothly led by the respective air guides. Particularly in this embodiment, an arc-shaped guide (the first air guide 91) and tangential air guides (the second air guide 92, the fourth air guide 94, and the fifth air guide 95) are provided, and therefore the high-temperature outdoor air is less likely to have a vortex (turbulent flow) or the like. Accordingly, the high-temperature outdoor air can be more smoothly discharged. In this embodiment, moreover, the shape of each air guide is in conformity with a swirling direction of the high-temperature outdoor air. Each air guide (especially each tangential air guide) is, therefore, asymmetric about an imaginary line passing through the lateral center of the air guide. Accordingly, the high-temperature outdoor air can be more smoothly discharged. As a result, it is easy for the radiator air-guide device 100 to suction fresh outdoor air. Thus, the cooling efficiency of the radiator 60 can be enhanced.

A direction in which high-temperature outdoor air is discharged will now be described. Here, a case is assumed in which the rear wall portion 83 is not provided and high-temperature outdoor air is discharged straight rearward from the fan shroud 80. In the motorcycle 1 of this embodiment, the engine 40 is arranged at the rear of the radiator 60, and therefore if high-temperature outdoor air is discharged straight rearward, the high-temperature outdoor air whose temperature is further raised by the engine 40 may diffuse to surroundings. Moreover, the motorcycle 1 of this embodiment includes the side cowl 24, and therefore heat is less likely to be released from side surfaces, which leads to fear that heat may stay or circulate inside the side cowl 24.

A case is assumed in which the lower wall portion 82 is not provided and high-temperature outdoor air is discharged straight downward from the fan shroud 80. In this embodiment, the exhaust pipe 57 is arranged below the fan shroud 80, and therefore if high-temperature outdoor air is discharged straight downward, the high-temperature outdoor air hits the exhaust pipe 57 which has a high temperature. As a result, the high-temperature outdoor air, whose temperature is further raised, may diffuse to surroundings. Moreover, the motorcycle 1 of this embodiment includes the side cowl 24, and therefore heat is less likely to be released from side surfaces, which leads to fear that heat may stay or circulate inside the side cowl 24.

In a case where the upper wall portion 81 is not provided and high-temperature outdoor air is discharged straight upward from the fan shroud 80, the high-temperature outdoor air cannot be discharged appropriately, because the upper side of the fan shroud 80 is closed by the fuel tank 54 or the like.

In a case where high-temperature outdoor air coming from the fan shroud 80 is discharged laterally outside alone, part of the high-temperature outdoor air flowing rearward is likely to hit the rider. Considering the above, this embodiment discharges high-temperature outdoor air through the left discharge opening 84 and the right discharge opening 85 which are formed in the laterally end portions of the fan shroud 80, a direction of the discharge including a downward component and a laterally outward component. Such a configuration can prevent high-temperature outdoor air from hitting the rider while efficiently discharging the high-temperature outdoor air outside the motorcycle 1.

In this embodiment, the radiator 60 and the fan shroud 80 are arranged tilted as described above. The rear wall portion 83 is, therefore, inclined so as to extend downward toward the rear. Thus, high-temperature outdoor air is discharged in a direction including a rearward component as shown in FIG. 2, etc. Here, the fan 70 suctions outdoor air in the rearward direction. Since the discharge direction includes the rearward component, too, it is possible to smoothly discharge the high-temperature outdoor air, though it depends on how the high-temperature outdoor air flows.

High-temperature outdoor air discharged from the left discharge opening 84 and the right discharge opening 85 is discharged outside through the second cowl openings 32 formed in the side cowl 24. Thus, the second cowl openings 32 are formed on an extension of the left discharge opening 84 or the right discharge opening 85. On the left side, as shown in FIG. 4, etc., at least part of an imaginary space obtained by extending the left discharge opening 84 in a guide direction (the direction in which the second air guide 92 or the third air guide 93 is inclined) passes through the second cowl opening 32. On the right side, likewise, at least part of an imaginary space obtained by extending the right discharge opening 85 in a guide direction (the direction in which the sixth air guide 96 or the seventh air guide 97 is inclined) passes through the second cowl opening 32. In this embodiment, moreover, another member that closes the second cowl opening 32 is not arranged in a path extending from the left discharge opening 84 or the right discharge opening 85 to the second cowl opening 32. Accordingly, as shown in FIG. 2, the right discharge opening 85 is visible through the second cowl opening 32 in a side view (the same is true for the left side).

In this embodiment, the second cowl openings 32 are arranged below the fuel tank 54 (to be exact, below the front portion of the fuel tank 54), as mentioned above. That is, the second cowl openings 32 are provided on the relatively front side as compared with the seat 55 and the steps 56. In such a configuration, high-temperature outdoor air discharged from the second cowl openings 32 is less likely to hit the rider.

The above-described configuration allows high-temperature outdoor air discharged from the left discharge opening 84 or the right discharge opening 85 to be efficiently discharged outside the motorcycle 1. Thus, the temperature of surroundings (especially at the rear) of the radiator 60 is less likely to rise. This can improve the degree of freedom in layout of electrical components and the like. For example, it is possible that an electrical component such as an ECU is arranged in a position above the engine 40, the position being rearward of the rear end of the radiator 60 and frontward of the rear end of the fuel tank 54.

As thus described above, the motorcycle 1 of this embodiment includes the radiator 60, the fan 70, and the fan shroud 80. The radiator 60 lowers the temperature of the coolant by heat exchange between outdoor air and the coolant. The fan 70 suctions outdoor air, to make the outdoor air hit the radiator 60 arranged upstream in the outdoor air flow direction. The fan shroud 80 covers at least part of the fan 70, and discharges high-temperature outdoor air, which is outdoor air suctioned by the fan 70 and having passed through the radiator 60, to outside. The fan shroud 80 has a discharge opening (the left discharge opening 84 and the right discharge opening 85) and an air guide (the first to eighth air guide 91 to 98). The discharge opening allows the high-temperature outdoor air to be discharged outside. The air guide guides the high-temperature outdoor air such that the high-temperature outdoor air is discharged through the discharge opening in a direction including a laterally outward component.

Since the high-temperature outdoor air can be discharged laterally outward, the high-temperature outdoor air is less likely to hit members included in the motorcycle 1, and therefore heat release performance can be improved. Accordingly, in a case where the amount of heat-resistant protection members used can be reduced, costs for the motorcycle 1 can be lowered. In addition, the degree of freedom in layout of electrical components and the like can be improved.

In the motorcycle 1 of this embodiment, the air guide guides the high-temperature outdoor air such that the high-temperature outdoor air is discharged in an obliquely downward direction that includes downward and laterally outward directions.

Since the direction in which the high-temperature outdoor air is discharged avoids a downward direction, the high-temperature outdoor air is further less likely to hit members included in the motorcycle 1.

The motorcycle 1 of this embodiment includes the exhaust pipe 57 through which exhaust gas generated in the engine 40 passes. The air guide guides the high-temperature outdoor air such that the high-temperature outdoor air is discharged in a direction that is more downward than the horizontal direction and that avoids a direction toward the exhaust pipe 57 in a front view.

The high-temperature outdoor air, therefore, is less likely to hit the exhaust pipe 57 having a high temperature. Thus, a phenomenon in which the temperature of the high-temperature outdoor air is further raised by the exhaust pipe 57 can be reduced. Accordingly, a decrease in the heat release performance can be prevented.

In the motorcycle 1 of this embodiment, the fan 70 suctions outdoor air by rotating the blades 71*a*. The air guide includes tangential air guides (the second air guide 92, the fourth air guide 94, the fifth air guide 95) each extending from a predetermined point on a circle centered at the rotation center of the fan 70, in a tangential direction and in the rotation axis direction of the fan 70 when viewed in the rotation axis direction of the fan 70.

Since a flow of the high-temperature outdoor air is regulated in this manner, the high-temperature outdoor air is likely to be discharged outside. Accordingly, the heat release performance can be further improved.

In the motorcycle 1 of this embodiment, the fan shroud 80 has the left discharge opening 84 and the right discharge opening 85, the left discharge opening 84 allowing the high-temperature outdoor air to be discharged therethrough in a direction including a left outward component, the right discharge opening 85 allowing the high-temperature outdoor air to be discharged therethrough in a direction including a right outward component. The tangential air guides include a tangential air guide (the second air guide 92) that guides the high-temperature outdoor air toward the left discharge opening 84 and a tangential air guide (the fourth air guide 94 and the fifth air guide 95) that guides the high-temperature outdoor air toward the right discharge opening 85. Each of the tangential air guides is asymmetric about an imaginary line passing through the lateral center thereof when viewed in the rotation axis direction of the fan 70.

In this configuration, the discharge openings and the tangential air guides are provided on both the left and right sides, which makes it further likely that the high-temperature outdoor air is discharged outside. Accordingly, the heat release performance can be still further improved.

In the motorcycle 1 of this embodiment, the fan shroud 80 has the lower wall portion 82 that covers the lower side of the fan 70.

With this configuration, the high-temperature outdoor air is less likely to flow downward. Accordingly, the high-temperature outdoor air is further less likely to hit members included in the motorcycle 1.

The motorcycle 1 of this embodiment includes the front protruding portion 86 that covers at least part of a region below the radiator 60, the front protruding portion 86 including a guide surface that is inclined or curved with its rear portion being more upward.

In this configuration, outdoor air can be easily introduced to the radiator 60. In addition, the radiator 60 is less likely to be damaged even when, for example, a stone bounces from a ground surface.

In the motorcycle 1 of this embodiment, the fan 70 is an axial-flow fan. The fan shroud 80 has the rear wall portion 83 that covers a rear side of the fan 70. The air guide guides high-temperature outdoor air having hit the rear wall portion 83 such that the high-temperature outdoor air is discharged through the discharge opening.

The presence of the rear wall portion 83 can prevent the high-temperature outdoor air from flowing rearward. The presence of the rear wall portion 83 makes it easy that the high-temperature outdoor air is discharged in a direction including a laterally outward component even when an axial-flow fan is used.

The motorcycle 1 of this embodiment includes a cowl (the front cowl 21, the side cowl 24) arranged at least laterally outward of the fan shroud 80. The cowl has a second cowl opening 32 through which the high-temperature outdoor air discharged from the discharge opening of the fan shroud 80 is discharged to outside.

Accordingly, the motorcycle 1, though provided with a cowl, is able to easily discharge high-temperature outdoor air to outside.

In the motorcycle 1 of this embodiment, at least part of an imaginary space obtained by extending the discharge opening in the guide direction passes through the second cowl opening 32.

Accordingly, high-temperature outdoor air is further likely to be discharged outside through the second cowl opening 32.

While a preferred embodiment of the present invention has been described above, the configuration described above may be modified, for example, as follows.

<Cowl>

The motorcycle 1 according to the embodiment described above includes a plurality of cowls. Here, the positions where the cowls are arranged, the positions where the cowls are parted from one another, and the configurations of the openings formed in the cowls are not limited to the ones illustrated in the embodiment described above. The second cowl opening 32 may not always need to be a boundary between a plurality of cowl members, but may be a through hole formed in a single cowl member.

<Radiator>

In the embodiment described above, the radiator 60 is arranged tilted. Instead of this, a radiator may be arranged without being tilted (with a front surface of the radiator extending in the vertical direction in a side view). In the embodiment described above, the core 62 has a substantially rectangular parallelepiped shape, but instead, the core may have a curved shape (specifically, a curved shape with its laterally outward sides being more frontward). In the embodiment described above, the introduction tank 61 and the outlet tank 63 are arranged laterally outward of the core 62, but instead, an introduction tank and an outlet tank may be arranged vertically outward of a core. Moreover, the structure for attaching the radiator 60, the position where the radiator 60 is attached, and the like, may be different from the ones illustrated in the embodiment described above.

<Fan>

The fan 70 is an axial-flow fan in the embodiment described above, but it may be a centrifugal fan. The number of blades 71a is optional. The ring portion 71b may not be indispensable. Although the fan 70 is attached to the fan shroud 80 in the embodiment described above, it may be attached to another member (for example, to the radiator 60). The fan 70 may be rotated while the motorcycle 1 is traveling at a high speed, or rotation of the fan 70 may be stopped while the motorcycle 1 is traveling at a low speed.

<Overall Configuration of Fan Shroud>

The fan shroud 80 of the embodiment described above includes a circular portion and laterally extending portions, but it may be shaped otherwise (for example, a rectangular parallelepiped portion may be provided instead of the circular portion). The fan shroud 80 of the embodiment described above includes the upper wall portion 81, the lower wall portion 82, and the rear wall portion 83, but at least one of them may be omitted or an opening may be formed in part of each wall portion. The fan shroud 80 may cover not part but the whole of the radiator 60. Although the fan shroud 80 is attached to the radiator 60, it may be attached to another member.

<Front Protruding Portion>

The front protruding portion 86 is arranged below the radiator 60 in the embodiment described above, but it may be arranged in another position (for example, lateral to or above the radiator 60). The front protruding portion 86 may be omitted, or may be a member separate from the fan shroud 80.

<Air Guide>

Although the embodiment described above illustrates a plurality of air guides having various features, it may not be necessary that all of them are provided, and a configuration having only part of them is also acceptable. That is, a configuration having no tangential air guide or a configuration having a tangential air guide that is laterally symmetric may be acceptable. In the embodiment described above, high-temperature outdoor air is discharged on both lateral sides, but high-temperature outdoor air may be discharged on only one of the lateral sides.

<Drive Source>

In the embodiment described above, the motorcycle 1 includes the engine 40 serving as a power unit (drive source), but an electric motor serving as another power unit may be used instead of or in addition to the engine. In such a configuration, the radiator is used to cool heat generated in at least one of the electric motor or an inverter.

<Application of the Present Invention>

The embodiment herein illustrates a case where the present invention is applied to a motorcycle intended primarily for sport driving on a paved road. The present invention, however, is applicable to other motorcycles (of motocross type, naked type, cruiser type, and the like). The present invention is also applicable to a straddle vehicle (which means a vehicle that a rider straddles when riding on) different from motorcycles. Main examples of such a straddle vehicle include ATVs (All Terrain Vehicles) for traveling on an unpaved road and PWCs (Personal Water Crafts).

What is claimed is:

1. A straddle vehicle, comprising:
   a radiator lowering a temperature of a coolant by heat exchange between outdoor air and the coolant;
   a fan suctioning the outdoor air to make the outdoor air hit the radiator arranged upstream in an outdoor air flow direction; and
   a fan shroud covering at least part of the fan, the fan shroud discharging high-temperature outdoor air to outside, the high-temperature outdoor air being the outdoor air suctioned by the fan and having passed through the radiator,
   wherein the fan shroud includes a discharge opening discharging the high-temperature outdoor air to outside, and an air guide guiding the high-temperature outdoor air such that the high-temperature outdoor air is discharged through the discharge opening in a direction including a laterally outward component,
   wherein the fan suctions outdoor air by rotating a blade, and wherein the air guide includes tangential air guides each extending from a predetermined point on a circle centered at a rotation center of the fan, in a tangential direction and in a rotation direction of the fan when viewed in a rotation axis direction of the fan,
   wherein the fan shroud has a left discharge opening and a right discharge opening, the left discharge opening allowing the high-temperature outdoor air to be discharged therethrough in a direction including a left outward component, the right discharge opening allowing the high-temperature outdoor air to be discharged therethrough in a direction including a right outward component,
   wherein the tangential air guides include a tangential air guide that guides the high-temperature outdoor air toward the left discharge opening and a tangential air guide that guides the high-temperature outdoor air toward the right discharge opening, and
   wherein each of the tangential air guides is asymmetric about an imaginary line passing through the lateral center thereof when viewed in the rotation axis direction of the fan.

2. The straddle vehicle according to claim 1, wherein the air guide guides the high-temperature outdoor air such that the high-temperature outdoor air is discharged in an obliquely downward direction that includes downward and laterally outward directions.

3. The straddle vehicle according to claim 2, further comprising:
an exhaust pipe through which an exhaust gas generated in an engine passes,
wherein the air guide guides the high-temperature outdoor air such that the high-temperature outdoor air is discharged in a direction that is more downward than a horizontal direction and that avoids a direction toward the exhaust pipe in a front view.

4. The straddle vehicle according to claim 1, wherein the fan shroud has a lower wall portion that covers a lower side of the fan.

5. The straddle vehicle according to claim 1, further comprising:
an outdoor air introduction guide covering at least part of a region below the radiator, the outdoor air introduction guide including a guide surface that is inclined or curved with its rear portion being more upward.

6. The straddle vehicle according to claim 1, wherein the fan is an axial-flow fan, wherein the fan shroud has a rear wall portion that covers a rear side of the fan, and wherein the air guide guides high-temperature outdoor air having hit the rear wall portion such that the high-temperature outdoor air is discharged through the discharge opening.

7. The straddle vehicle according to claim 1, further comprising:
a cowl arranged at least laterally outward of the fan shroud,
wherein the cowl has a cowl opening through which the high-temperature outdoor air discharged from the discharge opening of the fan shroud is discharged outside.

8. The straddle vehicle according to claim 7, wherein at least part of an imaginary space obtained by extending the discharge opening in a guide direction passes through the cowl opening.

9. A radiator air-guide device that introduces outdoor air to a radiator provided in a straddle vehicle and discharges the outdoor air, comprising:
a fan suctioning outdoor air to make the outdoor air hit the radiator arranged upstream in an outdoor air flow direction; and
a fan shroud covering at least part of the fan, the fan shroud discharging high-temperature outdoor air to outside, the high-temperature outdoor air being outdoor air suctioned by the fan and having passed through the radiator,
wherein the fan shroud includes a discharge opening discharging the high-temperature outdoor air to outside, and an air guide guiding the high-temperature outdoor air such that the high-temperature outdoor air is discharged through the discharge opening in a direction including a component that is directed laterally outward of the straddle vehicle,
wherein the fan suctions outdoor air by rotating a blade, and wherein the air guide includes tangential air guides each extending from a predetermined point on a circle centered at a rotation center of the fan, in a tangential direction and in a rotation direction of the fan when viewed in a rotation axis direction of the fan,
wherein the fan shroud has a left discharge opening and a right discharge opening, the left discharge opening allowing the high-temperature outdoor air to be discharged therethrough in a direction including a left outward component, the right discharge opening allowing the high-temperature outdoor air to be discharged therethrough in a direction including a right outward component,
wherein the tangential air guides include a tangential air guide that guides the high-temperature outdoor air toward the left discharge opening and a tangential air guide that guides the high-temperature outdoor air toward the right discharge opening, and
wherein each of the tangential air guides is asymmetric about an imaginary line passing through the lateral center thereof when viewed in the rotation axis direction of the fan.

10. A straddle vehicle, comprising:
a radiator lowering a temperature of a coolant by heat exchange between outdoor air and the coolant;
a fan suctioning the outdoor air to make the outdoor air hit the radiator arranged upstream in an outdoor air flow direction; and
a fan shroud covering at least part of the fan, the fan shroud discharging high-temperature outdoor air to outside, the high-temperature outdoor air being the outdoor air suctioned by the fan and having passed through the radiator,
wherein the fan shroud includes a discharge opening discharging the high-temperature outdoor air to outside, and an air guide guiding the high-temperature outdoor air such that the high-temperature outdoor air is discharged through the discharge opening in a direction including a laterally outward component,
wherein the fan shroud has a left discharge opening and a right discharge opening, the left discharge opening allowing the high-temperature outdoor air to be discharged therethrough in a direction including a left outward component, the right discharge opening allowing the high-temperature outdoor air to be discharged therethrough in a direction including a right outward component, and
wherein the left discharge opening and the right discharge opening are asymmetric about an imaginary line passing through the lateral center thereof when viewed in a rotation axis direction of the fan.

* * * * *